Feb. 13, 1923. 1,445,112
K. M. TITUS ET AL
MEASURING, DISPENSING, AND MIXING DEVICE
Filed July 11, 1921  2 sheets-sheet 2
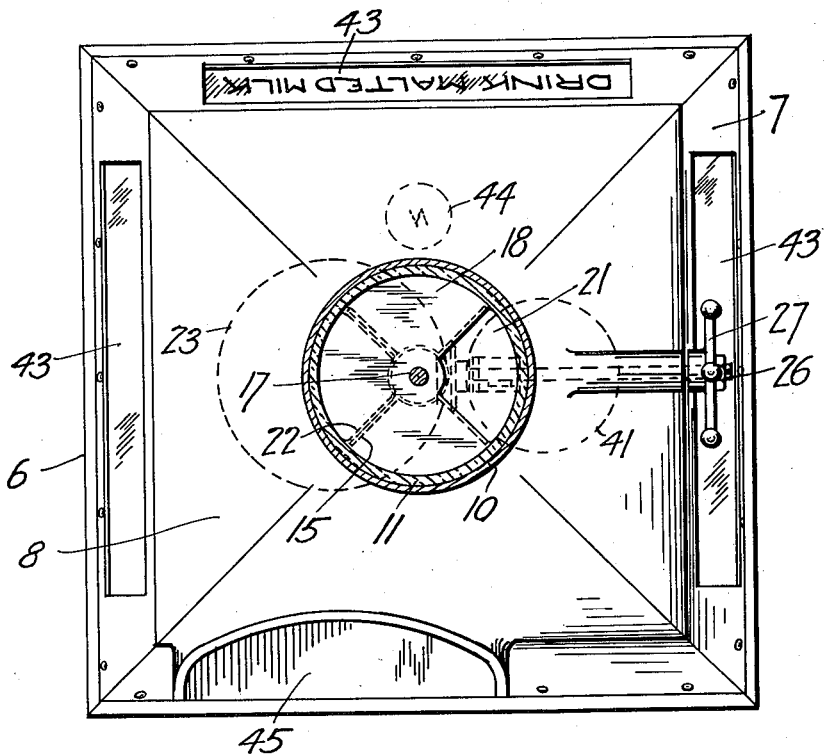
FIG. 2.
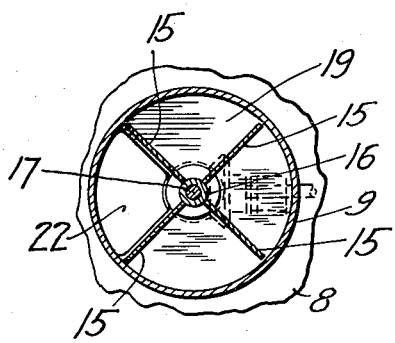
FIG. 3.
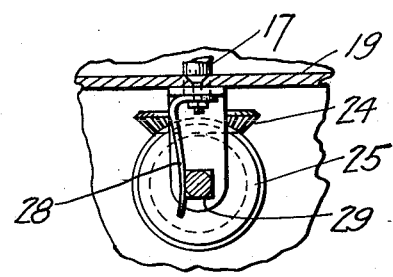
FIG. 4.
FIG. 5.
INVENTORS.
Kenneth Murray Titus
James William Dennis
BY
ATTORNEY.

Patented Feb. 13, 1923.

1,445,112

UNITED STATES PATENT OFFICE.

KENNETH MURRY TITUS AND JAMES WILLIAM DENNIS, OF LONGMONT, COLORADO.

MEASURING, DISPENSING, AND MIXING DEVICE.

Application filed July 11, 1921. Serial No. 483,894.

*To all whom it may concern:*

Be it known that we, KENNETH MURRY TITUS and JAMES WILLIAM DENNIS, citizens of the United States, both residing at Longmont, in the county of Boulder and State of Colorado, have invented a new and useful Measuring, Dispensing, and Mixing Device, of which the following is a specification.

Our invention relates to machines for dispensing granular or powdered materials, in measured quantities, and thoroughly mixing same with a liquid.

The primary object of our invention is to provide a novel and improved construction whereby a dispensing and measuring device of this kind is combined with a suitable mixing device to form a neat, inexpensive, self-contained and completely enclosed fixture for the measuring, dispensing and mixing of a dry powdered substance and a liquid.

Another object of our invention is to provide an agitating device to prevent the powder from becoming packed and force it into the measuring device.

Still another object of our invention is to provide a suitable casing or enclosure to protect the substance being mixed from dust, insects and impurities carried by the air.

With these and other useful objects in view, we will now proceed to describe our invention, reference being had to the accompanying drawings and the figures of reference placed thereon.

In the drawings:

Figure 2 is a horizontal section taken on the line 2—2, Fig. 1.

Figure 3, is a section taken on the line 3—3, Fig. 1.

Figure 4, is a section taken on the line 4—4, Fig. 1.

Figure 5, is a detail view showing the manner in which the agitating blades are mounted.

Like numbers refer to like parts throughout the specification and drawings.

Figure 1:
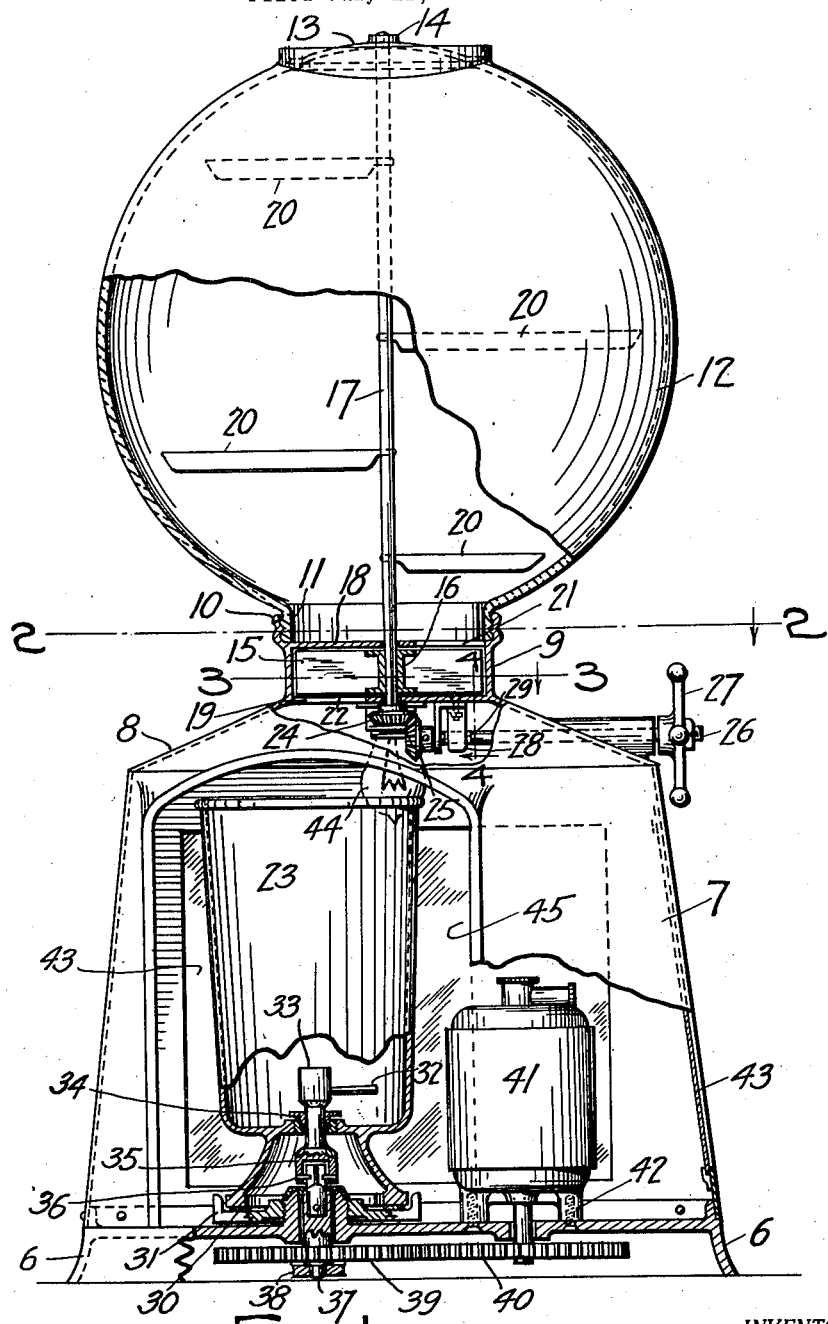
Figure 1 is a front elevation of our improved dispensing, measuring and mixing machine, partially in section to show the interior mechanism.

As thus illustrated, my invention comprises a base-plate 6, upon which is mounted a housing or frame 7, formed of thin sheet metal or similar material. The upper portion of the casing 7 is turned inwardly as shown at 8 to support a cylindrical measuring chamber 9 which terminates in a threaded flange 10. Flange 10 is adapted to receive a similarly threaded collar 11 formed upon a globe or bottle of glass or other material 12. The globe 12 acts as a receiving reservoir for the powdered material and is provided at the top with an opening for the reception of same. This opening is closed by a lid or cap 13, which carries as its center a bearing 14.

The dispensing and measuring device consists of four paddles or blades 15 equally spaced and radially mounted on a hub 16 which in turn is fixedly mounted on a vertical shaft 17. Blades 15 are adapted to fit snugly in the measuring chamber 9 and revolve therein. Measuring chamber 9 is closed at the top by a circular plate 18 and at the bottom by a similar plate 19, in which shaft 17 is journaled at its lower extremity. The upper end of shaft 17 is carried in the bearing 14. On that portion of shaft 17 which passes through globe 12, paddles or agitators 20 are mounted. These agitators are of the form shown in Fig. 5 and are so mounted that the rear edge of same as they pass through the material is relatively lower than the forward edge. Thereby tending to force the material to the bottom of the globe and into the measuring chamber 9, as they revolve therein.

In plate 18 of the measuring chamber 9, a segmental hole 21, is formed and in the lower plate 19, a similar hole 22, is also formed. These holes remove approximately one-fourth the area of the plates and are arranged on opposite sides of the shaft 17. A charge of the material to be measured will fall through the hole 21 and fill the space between two of the blades 15. Upon revolving shaft 17 the charge will be carried around to hole 22 and allowed to fall into a mixing vessel 23.

The lower extremity of the shaft 17 carries a bevel gear 24 which meshes with a similar bevel gear 25, carried on a horizontal shaft 26, which is journaled in the housing 7. Shaft 26 terminates exteriorly of the housing 7 in a hand-wheel 27, by which the measuring device is operated. A leaf spring 28 bears upon a square section 29, formed on the shaft 26 to inform the operator thereof when a quarter turn has been made of the handwheel 27.

Mixing vessel 23 rests on a cushion washer 30, consisting of rubber or other resilient material and is held in position by the cup shaped rest 31, which is secured to the base-plate 6. Arranged in the bottom of the vessel 23, is a stirring or mixing paddle 32, extending from a vertical shaft 33. Shaft 33 passes through a stuffing box 34 in the bottom of the vessel 23 and terminates in an inverted cup 35. Dowel pins 36 project inwardly from the sides of the cup 35 and engage in grooves formed on the upper extremity of a vertical shaft 37. This allows the easy removal of the mixing vessel 23 from the machine. Shaft 37 is supported by a cross piece 38, of the base-plate 6 and carries near its lower extremity a spur gear 39, which meshes with a similar spur gear 40 mounted on the shaft of a motor 41. Motor 41 is supported on the base-plate 6 by means of legs 42.

The two sides and rear of housing 7, are provided with openings 43, which are closed by means of transparent material that may be used for advertising signs and other purposes. A light 44 located within the housing 7 adds greater visibility to the signs.

In the front of the housing 7, an opening 45 is left for the removal and replacement of the mixing vessel 23.

In use, the mixing vessel 23 is removed from the housing and the liquid placed therein. The vessel is then replaced and the mixing mechanism set in motion. The powder is then dropped into the whirling liquid, which insures a quicker and more efficient mix than is possible when the mixing is started after the powder has been placed in the liquid.

While we have thus described a specific form of our invention we wish it understood that the same may be varied and departed from within the scope of the appended claims.

Having described our invention what we claim and desire to secure by Letters-Patent is:—

1. A measuring, dispensing and mixing device of the character described, comprising a base adapted to enclose power transmission mechanism; a housing mounted on said base and adapted to enclose a mixing cup and motor for actuating same; a measuring device mounted in said housing over said mixing cup and a container mounted over said measuring device.

2. A measuring, dispensing and mixing device comprising a housing adapted to support a measuring device; a base mounted in said housing; a motor mounted vertically on said base and having its shaft extending through said base; a counter shaft rotatably mounted in said base adjacent to said motor, said counter shaft adapted to detachably engage a mixing device and means for transmitting the motion of said motor to said counter shaft.

In testimony whereof we have signed our names in the presence of two witnesses.

KENNETH MURRY TITUS.
JAMES WILLIAM DENNIS.

Witnesses:
WILLIAM J. BERTRAM,
MAUD E. KIRKPATRICK.